(12) United States Patent
Kawanishi

(10) Patent No.: US 10,279,801 B2
(45) Date of Patent: May 7, 2019

(54) HYBRID VEHICLE

(71) Applicant: TOYOTA JIDOSHA KABUSHIKI KAISHA, Toyota-shi, Aichi-ken (JP)

(72) Inventor: Noritsugu Kawanishi, Toyota (JP)

(73) Assignee: Toyota Jidosha Kabushiki Kaisha, Toyota-shi, Aichi-ken (JP)

( * ) Notice: Subject to any disclaimer, the term of this patent is extended or adjusted under 35 U.S.C. 154(b) by 0 days.

(21) Appl. No.: 15/909,612

(22) Filed: Mar. 1, 2018

(65) Prior Publication Data
US 2018/0265073 A1 Sep. 20, 2018

(30) Foreign Application Priority Data

Mar. 14, 2017 (JP) .................................. 2017-48157

(51) Int. Cl.
| | | |
|---|---|---|
| *B60W 20/15* | (2016.01) | |
| *B60W 20/40* | (2016.01) | |
| *B60W 10/10* | (2012.01) | |
| *B60W 10/08* | (2006.01) | |
| *B60K 6/445* | (2007.10) | |

(52) U.S. Cl.
CPC .............. *B60W 20/15* (2016.01); *B60K 6/445* (2013.01); *B60W 10/08* (2013.01); *B60W 10/10* (2013.01); *B60W 20/40* (2013.01); *Y02T 10/6221* (2013.01); *Y02T 10/6239* (2013.01); *Y02T 10/6286* (2013.01); *Y02T 10/7077* (2013.01); *Y02T 10/7275* (2013.01)

(58) Field of Classification Search
CPC .......................... B60W 20/15; B60W 2560/02
See application file for complete search history.

(56) References Cited

U.S. PATENT DOCUMENTS

| | | | | |
|---|---|---|---|---|
| 5,670,830 A | * | 9/1997 | Koga ....................... | B60K 6/46 307/10.1 |
| 8,289,143 B2 | * | 10/2012 | Mizutani ................ | B60K 6/365 340/438 |
| 2013/0211641 A1 | * | 8/2013 | Fujii ..................... | B60W 10/06 701/22 |

(Continued)

FOREIGN PATENT DOCUMENTS

| | | |
|---|---|---|
| JP | 2004-320946 | 11/2004 |
| JP | 2006-254553 | 9/2006 |
| JP | 2007-143298 | 6/2007 |

*Primary Examiner* — Brian L Swenson
(74) *Attorney, Agent, or Firm* — Finnegan, Henderson, Farabow, Garrett & Dunner, LLP

(57) ABSTRACT

A hybrid vehicle comprises an engine configured to be driven with a fuel supplied from a fuel tank; a motor configured to input and output a power for driving; and a control device configured to drive the engine and the motor. When a remaining amount of fuel in the fuel tank is lower than a predetermined level, the control device provides a smaller absolute value of a torque lower limit value of the motor during deceleration at a vehicle speed of lower than a predetermined vehicle speed, compared with an absolute value during deceleration at the vehicle speed of not lower than the predetermined vehicle speed. This configuration suppresses a deceleration torque of a large absolute value from being output from the motor during deceleration at the low vehicle speed and accordingly suppresses a loss of the motor or the like from becoming greater than the regenerative energy.

11 Claims, 4 Drawing Sheets

(56) References Cited

U.S. PATENT DOCUMENTS

| | | | | |
|---|---|---|---|---|
| 2014/0288741 A1* | 9/2014 | Oonishi | ................ | B60W 20/40 701/22 |
| 2015/0051825 A1* | 2/2015 | Saavedra | ................ | G01F 9/023 701/123 |
| 2017/0101023 A1* | 4/2017 | Nawata | ................... | B60L 1/006 |

* cited by examiner

HYBRID VEHICLE

CROSS-REFERENCE TO RELATED APPLICATIONS

The present disclosure claims priority to Japanese Patent Application No. 2017-048157 filed Mar. 14, 2017, which is incorporated herein by reference in its entirety including specification, drawings and claims.

TECHNICAL FIELD

The present disclosure relates to a hybrid vehicle.

BACKGROUND

A proposed configuration of a hybrid vehicle gives a higher priority to regenerative braking and relieves charge power limitation during regenerative control, when a fuel tank has only a small remaining amount of fuel (as described in, for example, JP2006-254553A). The hybrid vehicle of this configuration performs this control, in order to increase the drivable distance under the condition of only a small remaining amount of fuel.

SUMMARY

In some cases, however, the hybrid vehicle of the above configuration is likely to have a short drivable distance. Regeneration with output of a large deceleration torque from the motor during deceleration at a relatively low vehicle speed may cause a loss of the motor or like to become greater than the regenerative energy. This decreases the drivable distance.

A hybrid vehicle of the present disclosure mainly aims to increase the drivable distance when a fuel tank has only a small remaining amount of fuel.

In order to achieve the above primary object, the hybrid vehicle of the present disclosure employs the following configuration.

The present disclosure is directed to a hybrid vehicle. The hybrid vehicle includes an engine configured to be driven with a fuel supplied from a fuel tank, a motor configured to input and output a power for driving, a power storage device configured to transmit an electric power to and from the motor and a control device configured to drive the engine and the motor. When a remaining amount of fuel in the fuel tank is lower than a predetermined level, the control device provides a smaller absolute value of a torque lower limit value of the motor during deceleration at a vehicle speed of lower than a predetermined vehicle speed, compared with an absolute value during deceleration at the vehicle speed of not lower than the predetermined vehicle speed.

When the remaining amount of fuel in the fuel tank is lower than the predetermined level, the hybrid vehicle of this aspect provides the smaller absolute value of the torque lower limit value of the motor during deceleration at the vehicle speed of lower than the predetermined vehicle speed, compared with the absolute value during deceleration at the vehicle speed of not lower than the predetermined vehicle speed. This configuration suppresses a deceleration torque of a large absolute value from being output from the motor during deceleration at the low vehicle speed and accordingly suppresses a loss of the motor or the like from becoming greater than the regenerative energy. As a result, this increases a drivable distance when the fuel tank has only a small remaining amount of fuel.

DESCRIPTION OF EMBODIMENTS

Figure 1:
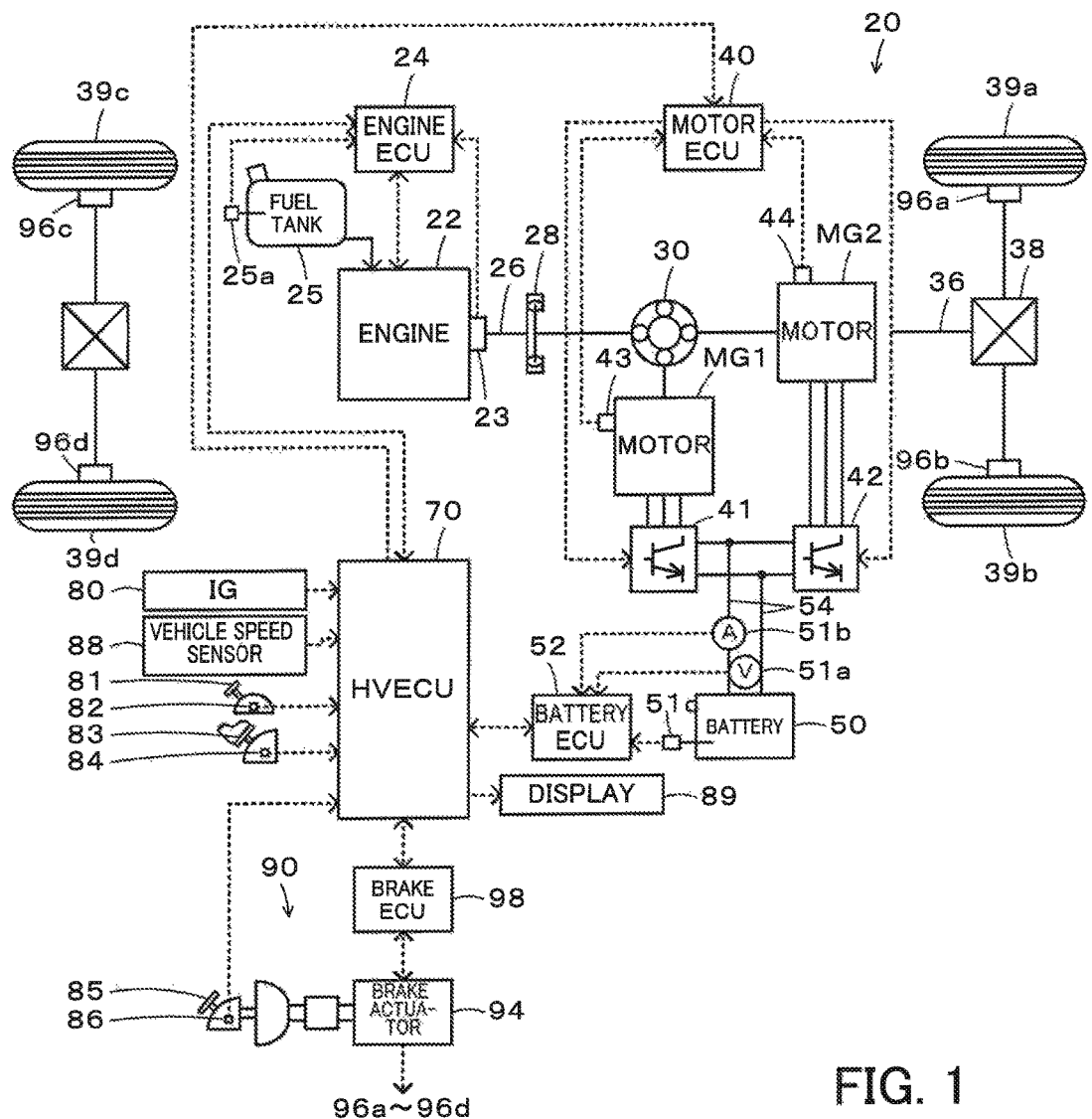
FIG. 1 is a configuration diagram illustrating the schematic configuration of a hybrid vehicle according to an embodiment of the present disclosure.

The following describes some aspects of the disclosure with reference to embodiments. FIG. 1 is a configuration diagram illustrating the schematic configuration of a hybrid vehicle 20 according to an embodiment of the present disclosure. As illustrated, the hybrid vehicle 20 of the embodiment includes an engine 22, a planetary gear 30, motors MG1 and MG2, inverters 41 and 42, a battery 50, a hydraulic brake system 90, and a hybrid electronic control unit (hereinafter referred as "HVECU") 70.

The engine 22 is configured as an internal combustion engine that output power using, for example, gasoline or light oil as fuel. This engine 22 is operated and controlled by an engine electronic control unit (hereinafter referred to as engine ECU) 24.

The engine ECU 24 is configured as a CPU-based microprocessor and includes a ROM configured to store processing programs, a RAM configured to temporarily store data, input/output ports and a communication port, in addition to the CPU, although not being illustrated. Signals from various sensors required for operation control of the engine 22, for example, a crank angle θcr from a crank position sensor 23 configured to detect the rotational position of a crankshaft 26 of the engine 22 and a remaining amount of fuel Qgas from a fuel level sensor 25a mounted to a fuel tank 25 are input into the engine ECU 24 via the input port. Various control signals for operation control of the engine 22 are output from the engine ECU 24 via the output port. The engine ECU 24 is connected with the HVECU 70 via the respective communication ports. The engine ECU 24 calculates a rotation speed Ne of the engine 22, based on the crank angle θcr input from the crank position sensor 23.

The planetary gear 30 is configured as a single pinion-type planetary gear mechanism. The planetary gear 30 includes a sun gear that is connected with a rotor of the motor MG1. The planetary gear 30 also includes a ring gear that is connected with a driveshaft 36 linked with drive wheels 39a and 39b via a differential gear 38. The planetary gear 30 also includes a carrier that is connected with the crankshaft 26 of the engine 22 via a damper 28.

The motor MG1 may be configured, for example, as a synchronous generator motor and includes the rotor that is connected with the sun gear of the planetary gear 30 as described above. The motor MG2 may be configured, for example, as a synchronous generator motor and includes a rotor that is connected with the driveshaft 36. The inverters 41 and 42 are connected with the motors MG1 and MG2 and are also connected with the battery 50 via power lines 54. A motor electronic control unit (hereinafter referred to as "motor ECU") 40 performs switching control of a plurality of switching elements (not shown) included in the respective inverters 41 and 42, so as to rotate and drive the motors MG1 and MG2.

Although not illustrated, the motor ECU 40 implemented by a CPU-based microprocessor and includes a ROM that stores processing programs, a RAM that temporarily stores data, input-output ports and a communication port other than the CPU. The motor ECU 40 inputs via the input port signals required to drive and control the motors MG1 and MG2: for example, rotational positions θm1 and θm2 from rotational position detection sensors 43 and 44 that detect the rotational positions of rotators of the motors MG1 and MG2. The motor ECU 40 outputs, via the output port, switching control signals to non-illustrated switching elements of the inverters 41 and 42. The motor ECU 40 communicates with the HVECU 70 via the respective communication ports. The motor ECU 40 also calculates rotation speeds Nm1 and Nm2 of the motors MG1 and MG2, based on the rotational positions θm1 and θm2 of the rotors of the motors MG1 and MG2 from the rotational position detection sensors 43 and 44.

The battery 50 is configured, for example, as a lithium ion secondary battery or a nickel metal hydride secondary battery. This battery 50 is connected with the inverters 41 and 42 via the power lines 54. The battery 50 is under management of a battery electronic control unit (hereinafter referred to as "battery ECU") 52.

The battery ECU 52 is configured as a CPU-based microprocessor and includes a ROM configured store processing programs, a RAM configured to temporarily store data, input/output ports and a communication port, in addition to the CPU, although not being illustrated. Signals from various sensors required for management of the battery 50 are input into the battery ECU 52 via the input port. The signals input into the battery ECU 52 include, for example, a battery voltage Vb from a voltage sensor 51a placed between terminals of the battery 50, a battery current Ib from a current sensor 51b mounted to an output terminal of the battery 50, and a battery temperature Tb from a temperature sensor 51c mounted to the battery 50. The battery ECU 52 is connected with the HVECU 70 via the respective communication ports. The battery ECU 52 calculates a state of charge SOC, based on an integrated value of the battery current Ib input from the current sensor 51b. The state of charge SOC denotes a ratio of the capacity of electric power dischargeable from the battery 50 to the overall capacity of the battery 50.

The hydraulic brake system 90 includes brake wheel cylinders 96a, 96b, 96c and 96d mounted to the drive wheels 39a and 39b and driven wheels 39c and 39d, and a brake actuator 94. The brake actuator 94 is configured as an actuator to regulate the hydraulic pressures of the brake wheel cylinders 96a, 96b, 96c and 96d and apply braking forces to the drive wheels 39a and 39b and to the driven wheels 39c and 39d. This brake actuator 94 is driven and controlled by a brake electronic control unit (hereinafter referred to as "brake ECU") 98.

The brake ECU 98 is configured as a CPU-based microprocessor and includes a ROM configured to store processing programs, a RAM configured to temporarily store data, input/output ports and a communication port, in addition to the CPU, although not being illustrated. Signals from various sensors required for drive control of the brake actuator 94 are input into the brake ECU 98 via the input port. For example, a drive control signal to the brake actuator 94 is output from the brake ECU 98 via the output port. The brake ECU 98 is connected with the HVECU 70 via the respective communication ports.

The HVECU 70 is configured as a CPU-based microprocessor and includes a ROM configured to store processing programs, a RAM configured to temporarily store data, input/output ports and a communication port, in addition to the CPU, although now being illustrated. Signals from various sensors are input into the HVECU 70 via the input port. The signals input into the HVECU 70 include, for example, an ignition signal from an ignition switch 80 and a shift position SP from a shift position sensor 82 configured to detect an operating position of a shift lever 81. Examples of the shift position SP include a parking position (P position), a reverse position (R position), a neutral position (N position) and a drive position (D position). The input signals also include an accelerator position Acc from an accelerator pedal position sensor 84 configured to detect a depression amount of an accelerator pedal 83, a brake pedal position BP from a brake pedal position sensor 86 configured to detect a depression amount of a brake pedal 85, and a vehicle speed V from a vehicle speed sensor 88. For example, a display control signal to a display 89 built in an installation panel in front of the driver's seat is output from the HVECU 70 via the output port. The HVECU 70 is connected with the engine ECU 24, the motor ECU 40, the battery ECU 52 and the brake ECU 98 via the respective communication ports.

The hybrid vehicle 20 of the embodiment having the above configuration may be driven in an electric drive (EV drive) mode without operation of the engine 22 or in a hybrid drive (HV drive) mode with operation of the engine 22.

The hybrid vehicle 20 is basically driven as described below in the EV drive mode. The HVECU 70 first sets a required torque Td* that is required for driving (i.e., required for the driveshaft 36), based on the accelerator position Acc and the vehicle speed V. The HVECU 70 subsequently sets a torque command Tm1* of the motor MG1 to a value 0, sets a torque command Tm2* of the motor MG2 such that the required torque Td* is output to the driveshaft 36 within a range of an input limit Win and an output limit Wout of the battery 50, and sends the settings of the torque commands Tm1* and Tm2* of the motors MG1 and MG2 to the motor ECU 40 The motor ECU 40 performs switching control of the plurality of switching elements included in the respective inverters 41 and 42, such as to drive the motors MG1 and MG2 with the torque commands Tm1* and Tm2*.

The hybrid vehicle 20 is basically driven as described below in the HV drive mode. The HVECU 70 first sets the required torque Td* that is required for driving (i.e., required for the driveshaft 36), based on the accelerator position Acc and the vehicle speed V, and sets a required power Pd* that is required for driving by multiplying the set required torque Td* by a rotation speed Nd of the driveshaft 36 (i.e., rotation speed Nm2 of the motor MG2). The HVECU 70 subsequently sets a required power Pe* that is required for the vehicle (i.e., required for the engine 22) by subtracting a required charge-discharge power Pb* of the battery 50 (which takes a positive value when the battery 50 is discharged) based on the state of charge SOC of the battery 50 from the required power Pd*. The HVECU 70 subsequently sets a target rotation speed Ne* and a target torque Te* of the engine 22 and torque commands Tm1* and Tm2* of the motors MG1 and MG2, such that the required power Pe* is output from the engine 22 and that the required torque Td* is output to the driveshaft 36 within the range of the input limit Win and the output limit Wout of the battery 50. The HVECU 70 then sends the settings of the target rotation speed Ne* and the target torque Te* of the engine 22 to the engine ECU 24, while sending the settings of the torque commands Tm1* and Tm2* of the respective motors MG1 and MG2 to the motor ECU 40. The engine ECU 24 performs, for example, intake air flow control, fuel injection control and ignition control of the engine 22, such as to operate the engine 22 at the target rotation speed Ne* and the target torque Te*. The motor ECU 40 performs switching control of a plurality of the switching elements included in the respective inverters 41 and 42, such as to drive the motors MG1 and MG2 with the torque commands Tm1* and Tm2*.

In the hybrid vehicle 20 of the embodiment, when a braking force is applied by the driver's accelerator-off operation or when a braking force is applied to decelerate the vehicle by the driver's depression of the brake pedal 85, the HVECU 70 first sets the required torque Td* (negative value) as a braking force required for driving (i.e., required for the driveshaft 36) based on the brake pedal position BP and the vehicle speed V. The HVECU 70 subsequently sets the torque command Tm2* (negative value) of the motor MG2 as a regenerative torque within a range of a torque lower limit value Tm2lim. More specifically, the larger value (i.e., the smaller absolute value) between the required torque Td* and the torque lower limit value Tm2lim is set to the torque command Tm2*. The HVECU 70 subsequently sets a remaining portion of the required torque Td* (Td*-Tm2lim) that is not covered by the torque lower limit value Tm2lim, as a brake torque command Tb*. The HVECU 70 sends the torque command Tm2* to the motor ECU 40, while sending the brake torque command Tb* to the brake ECU 98. The motor ECU 40 performs switching control of the plurality of switching elements included in the inverter 42, such as to cause the torque command Tm2* as the regenerative torque to be output from the motor MG2. The brake ECU 98 controls the brake actuator 94, such as to apply a braking force corresponding to the brake torque command Tb* to the drive wheels 39a and 39b and to the driven wheels 39c and 39d. During deceleration, the engine 22 is controlled to stop operation or to have self-sustained operation at a rotation speed according to the vehicle speed V, and the motor MG1 is under zero torque control (i.e., output control of the torque equal to zero).

Figure 2:
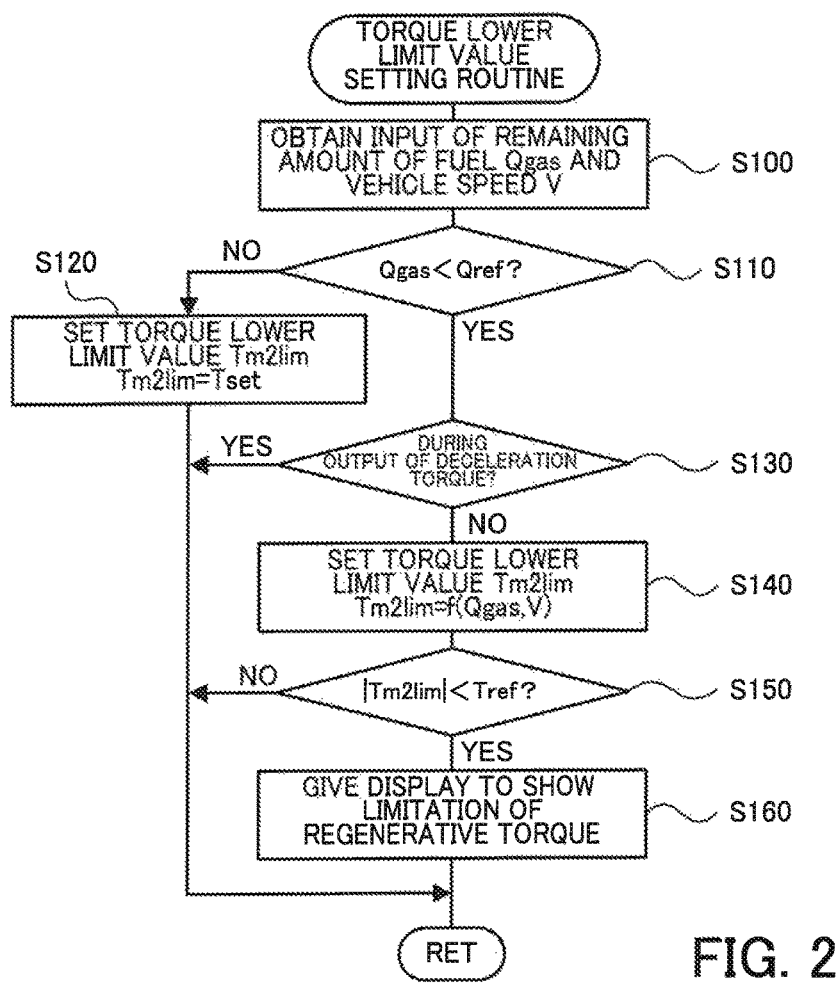
FIG. 2 is a flowchart showing one example of a torque lower limit value setting routine performed by the HVECU.

The following describes a process of setting the torque lower limit value Tm2lim of the motor MG2 that is used in deceleration of the hybrid vehicle 20 according to the embodiment. FIG. 2 is a flowchart showing one example of a torque lower limit value setting routine performed by the HVECU 70. This routine is performed repeatedly at predetermined time intervals (for example, at every several msec).

When the torque lower limit value setting routine is triggered, the HVECU 70 first obtains input of data required for setting the torque lower limit value Tm2lim, for example, the remaining amount of fuel Qgas and the vehicle speed V from the vehicle speed sensor 88 (step S100). The remaining amount of fuel Qgas input here is a value detected by the fuel level sensor 25a and input by communication with the engine ECU 24.

The HVECU 70 subsequently determines whether the input remaining amount of fuel Qgas is lower than a reference value Qref (step S110). The reference value Qref is determined in advance as a relatively small remaining amount, for example, one fourth or one fifth of the total capacity of the fuel tank 25. When it is determined that the remaining amount of fuel Qgas is equal to or higher than the reference value Qref, the HVECU 70 sets a default value Tset to the torque lower limit value Tm2lim of the motor MG2 (step S120) and terminates this routine. The default value Tset may be determined according to, for example, the performance of the motor MG2.

When it is determined at step S110 that the remaining amount of fuel Qgas is lower than the reference value Qref, on the other hand, the HVECU 70 subsequently determines whether the motor MG2 currently outputs a deceleration torque (step S130). This determination is based on determination of whether the torque command Tm2* of the motor MG2 is a negative value or not. When it is determined that the motor MG2 currently outputs a deceleration torque, the HVECU 70 terminates the routine without newly setting the torque lower limit value Tm2lim. This means that the set torque lower limit value Tm2lim is kept unchanged. This reason will be described later.

Figure 3:
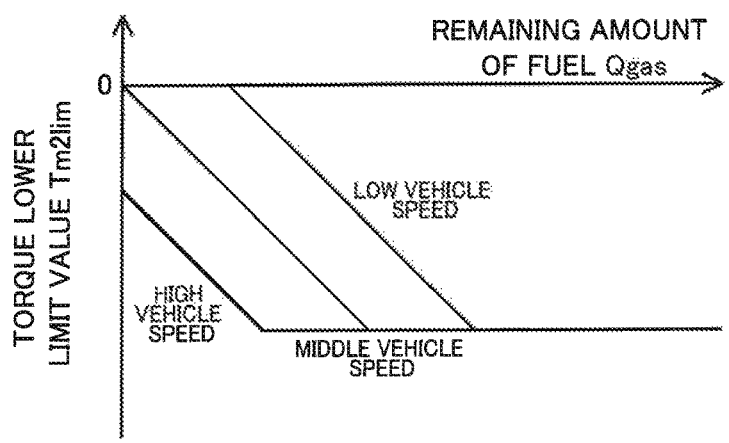
FIG. 3 is one example of the torque lower limit value setting map.

When it is determined at step S130 that the motor MG2 does not currently output a deceleration torque, on the other hand, the HVECU 70 sets the torque lower limit value Tm2lim, based on the remaining amount of fuel Qgas and the vehicle speed V (step S140). As described above, this torque lower limit value Tm2lim is used to determine the torque command Tm2* of the motor MG2 when a braking force is applied by the driver's accelerator-off operation or when a braking force is applied to decelerate the vehicle by the driver's depression of the brake pedal 85. According to the embodiment, a procedure employed to set the torque lower limit value Tm2lim stores in advance a predetermined relationship between the remaining amount of fuel Qgas, the torque lower limit value Tm2lim and the vehicle speed V as a torque lower limit value setting map and reads the torque lower limit value Tm2lim corresponding to the given remaining amount of fuel Qgas and the given vehicle speed V from the map. One example of the torque lower limit value setting map is shown in FIG. 3. According to the embodiment, the torque lower limit value Tm2lim is set to increase (i.e., to decrease as the absolute value) with a decrease in remaining amount of fuel Qgas and to increase (i.e., to decrease as the absolute value) with a decrease in vehicle speed V. In other words, a larger value (a smaller absolute value) is set to the torque lower limit value Tm2lim at the lower remaining amount of fuel Qgas, compared with the value at the higher remaining amount of fuel gas Qgas. A larger value (a smaller absolute value) is set to the torque lower limit value Tm2lim at the smaller value of vehicle speed V, compared with the value at the larger value of vehicle speed V. When a regenerative torque is output from the motor MG2 at the small value of vehicle speed V (i.e., at the low vehicle speed), a loss of the motor MG2, the inverter 42 and the like is likely to be greater than the regenerative energy. In general, the loss increases with an increase in regenerative torque. Decreasing the regenerative torque accordingly decreases the loss. The configuration of this embodiment restricts the torque lower limit value Tm2lim of the motor MG2 during deceleration at the low vehicle speed and at the low remaining amount of fuel Qgas, thereby reducing energy consumption and increasing the drivable distance. The torque lower limit value Tm2lim is increased (i.e., the absolute value of the torque lower limit value Tm2lim is decreased) with a decrease in remaining amount of fuel Qgas, for the purpose of gradually decreasing the absolute value of the torque lower limit value Tm2lim of the motor MG2 with a decrease in remaining amount of fuel Qgas. The torque lower limit value Tm2lim is increased (i.e., the absolute value of the torque lower limit value Tm2lim is decreased) with a decrease in vehicle speed V, since the loss is likely to be greater than the regenerative energy at the lower vehicle speed V.

The HVECU 70 subsequently determines whether the absolute value of the set torque lower limit value Tm2lim is less than a reference value Tref (step S150). When it is determined that the absolute value of the torque lower limit value Tm2lim is less than the reference value Tref, the HVECU 70 gives a display to show limitation of the regenerative torque by the motor MG2 on the display 89 that is built in the installation panel in front of the driver's seat (step S160) and then terminates the routine. This notifies the driver of limitation of the regenerative torque by the motor MG2 and thereby relieves the driver's feeling of strangeness due to a decrease in regenerative torque of the motor MG2. When the absolute value of the torque lower limit value Tm2lim is equal to or greater than the reference value Tref, on the other hand, the HVECU 70 terminates the routine without giving a display to show limitation of the regenerative torque by the motor MG2 on the display 89.

The following describes a reason why the torque lower limit value Tm2lim is not set when it is determined at step S130 that the motor MG2 currently output a deceleration torque. The torque lower limit value Tm2lim is set to increase (i.e., to decrease as the absolute value) with a decrease in remaining amount of fuel Qgas and with a decrease in vehicle speed V. Changing the torque lower limit value Tm2lim during output of a deceleration torque from the motor MG2 results in changing the regenerative torque from the motor MG2 to increase (i.e., to decrease as the absolute value) during deceleration. The torque of this change is output from the hydraulic brake system 90. The response of the motor MG2 is, however, higher than the response of the hydraulic brake system 90. This is likely to cause the driver to feel torque missing for a short time. Such torque missing gives the driver a feeling of strangeness. In order to avoid such inconvenience, the procedure of the embodiment does not newly set the torque lower limit value Tm2lim (i.e., keeps the set torque lower limit value Tm2lim unchanged) when it is determined that the motor MG2 currently outputs a deceleration torque.

Figure 4:
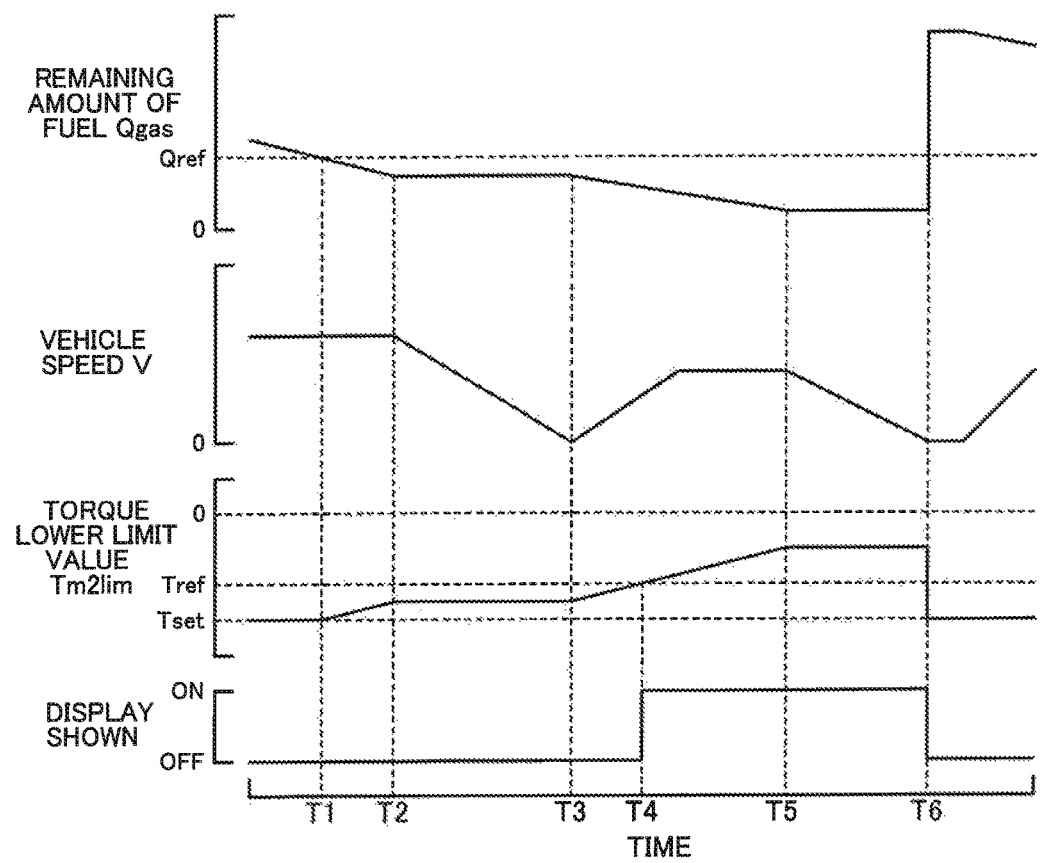
FIG. 4 is a graph showing one example of time changes in the remaining amount of fuel, the vehicle speed, the torque lower limit value and the display given to show limitation of the regenerative torque by the motor MG2 in the hybrid vehicle of the embodiment.

FIG. 4 is a graph showing one example of time changes in the remaining amount of fuel Qgas, the vehicle speed V, the torque lower limit value Tm2lim and the display given to show limitation of the regenerative torque by the motor MG2 in the hybrid vehicle 20 of the embodiment. The torque lower limit value Tm2lim is set according to the remaining amount of fuel Qgas and the vehicle speed V from a time T1 when the remaining amount of fuel Qgas becomes lower than the reference value Qref to a time T2 when deceleration starts. The torque lower limit value Tm2lim set at the time T2 is kept unchanged from the time T2 when deceleration starts to a time T3 when deceleration is terminated. The torque lower limit value Tm2lim is set according to the remaining amount of fuel Qgas and the vehicle speed V from the time T3 when deceleration is terminated and acceleration starts to a time T5 when next deceleration starts. At a time T4 when the absolute value of the torque lower limit value Tm2lim becomes less than the reference value Tref, a display given to show limitation of the regenerative torque by the motor MG2 on the display 89 is started. The torque lower limit value Tm2lim set at the time T5 is kept unchanged from the time T5 when deceleration starts to a time T6 when deceleration is terminated. At the time T6 when the remaining amount of fuel Qgas becomes equal to or higher than the reference value Qref by fuel supply, the default value Tset is set to the torque lower limit value Tm2lim, and the display given to show limitation of the regenerative torque by the motor MG2 on the display 89 is stopped.

In the hybrid vehicle 20 of the embodiment described above, when the remaining amount of fuel Qgas is lower than the reference value Qref, a larger value (i.e., a smaller absolute value) is set to the torque lower limit value Tm2lim at the lower vehicle speed V than the value at the higher vehicle speed V. This reduces energy consumption and increases the drivable distance. The torque lower limit value Tm2lim is not newly set (i.e., the set torque lower limit value Tm2lim is kept unchanged) when it is determined that the motor MG2 currently outputs a deceleration torque. This suppresses the driver from having a feeling of strangeness due to, for example, torque missing. Additionally, when the absolute value of the torque lower limit value Tm2lim is less than the reference value Tref, the display is given to show limitation of the regenerative torque by the motor MG2 on the display 89. This notifies the driver of limitation of the regenerative torque by the motor MG2 and relieves the driver's feeling of strangeness caused by reduction of the regenerative torque of the motor MG2.

When the remaining amount of fuel Qgas is lower than the reference value Qref, the hybrid vehicle 20 of the embodiment sets the torque lower limit value Tm2lim to increase (i.e., to decrease as the absolute value) with a decrease in remaining amount of fuel Qgas and to increase (i.e., to decrease as the absolute value) with a decrease in vehicle speed V. When the remaining amount of Qgas is lower than the reference value Qref, however, a modification may set the torque lower limit value Tm2lim to increase (to decrease as the absolute value) with a decrease in vehicle speed V irrespective of the remaining amount of fuel Qgas.

The hybrid vehicle 20 of the embodiment does not newly set the torque lower limit value Tm2lim (i.e., keeps the set torque lower limit value Tm2lim unchanged) during output of a deceleration torque from the motor MG2. A modification may newly set the torque lower limit value Tm2lim (i.e., change the setting of the torque lower limit value Tm2lim) even during output of a deceleration torque from the motor MG2.

When the absolute value of the torque lower limit value Tm2lim is less than the reference value Tref, the hybrid vehicle 20 of the embodiment gives a display to show limitation of the regenerative torque by the motor MG2 on the display 89. The notification is, however, not restricted to the display given on the display 89 but may be a voice notification, as long as the driver is notified of limitation of the regenerative torque by the motor MG2.

The hybrid vehicle 20 of the embodiment is equipped with the engine ECU 24, the motor ECU 40, the battery ECU 52 and the HVECU 70. The engine ECU 24, the motor ECU 40, the battery ECU 52 and the HVECU 70 may be configured by a single electronic control unit.

Figure 5:
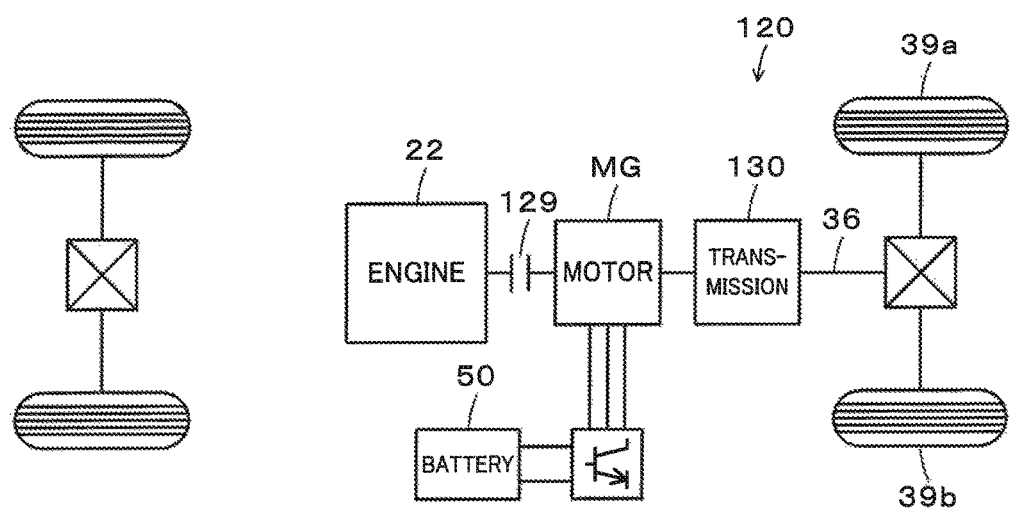
FIG. 5 is a configuration diagram illustrating the schematic configuration of another hybrid vehicle according to another modification.

The hybrid vehicle 20 of the embodiment is configured such that the engine 22 and the motor MG1 are connected via the planetary gear 30 with the driveshaft 36 that is coupled with the drive wheels 39*a* and 39*b* and that the motor MG2 is connected with the driveshaft 36. As shown in FIG. 5, however, a hybrid vehicle 120 of a modification may be configured such that a motor MG is connected via a transmission 130 with a driveshaft 36 that is coupled with drive wheels 39*a* and 39*b* and that an engine 22 is connected via a clutch 129 with a rotating shaft of the motor MG. The present disclosure is applicable to a hybrid vehicle of any configuration. The battery 50 may be replaced with another power storage device, such as a capacitor.

In the hybrid vehicle of this aspect, the control device may decrease the absolute value of the torque lower limit value of the motor during deceleration with a decrease in remaining amount of fuel. This configuration enables the absolute value of the torque lower limit value of the motor to be gradually decreased with a decrease in remaining amount of fuel. Further, the control device may decrease the absolute value of the torque lower limit value of the motor during deceleration with a decrease in vehicle speed. This configuration enables the absolute value of the torque lower limit value of the motor to be determined according to the vehicle speed.

In the hybrid vehicle of another aspect, the control device may prohibit the torque lower limit value from being changed during output of a deceleration torque from the motor. This configuration prevents missing (reduction) of the deceleration torque during deceleration.

In the hybrid vehicle of another aspect, when the absolute value of the torque lower limit value is less than a predetermined value, the control device may give a notification of a small absolute value of the torque lower limit value. This configuration notifies the driver of the decreasing absolute value of the torque lower limit value and thereby relieves the driver's feeling of strangeness due to the decreasing absolute value of the torque lower limit value.

The following describes the correspondence relationship between the primary components of the embodiment and the primary components of the disclosure described in Summary. The engine 22 of the embodiment corresponds to the "engine", the motor MG2 corresponds to the "motor", the battery 50 corresponds to the "power storage device", and the HVECU 70 corresponds to the "control device".

The correspondence relationship between the primary components of the embodiment and the primary components of the disclosure, regarding which the problem is described in Summary, should not be considered to limit the components of the disclosure, regarding which the problem is described in Summary, since the embodiment is only illustrative to specifically describes the aspects of the disclosure, regarding which the problem is described in Summary. In other words, the disclosure, regarding which the problem is described in Summary, should be interpreted on the basis of the description in the Summary, and the embodiment is only a specific example of the disclosure, regarding which the problem is described in Summary.

The aspect of the disclosure is described above with reference to the embodiment. The disclosure is, however, not limited to the above embodiment but various modifications and variations maybe made to the embodiment without departing from the scope of the disclosure.

INDUSTRIAL APPLICABILITY

The technique of the disclosure is preferably applicable to the manufacturing industries of the hybrid vehicle and so on.

The invention claimed is:

1. A hybrid vehicle, comprising:
   an engine configured to be driven with a fuel supplied from a fuel tank;
   a motor configured to input and output a power for driving;
   a power storage device configured to transmit an electric power to and from the motor; and
   a control device configured to drive the engine and the motor,
   wherein when a remaining amount of fuel in the fuel tank is lower than a predetermined level, the control device provides a smaller absolute value of a torque lower limit value of the motor during deceleration at a vehicle speed of lower than a predetermined vehicle speed, compared with an absolute value during deceleration at the vehicle speed of not lower than the predetermined vehicle speed.

2. The hybrid vehicle according to claim 1, wherein the control device decreases the absolute value of the torque lower limit value of the motor during deceleration with a decrease in remaining amount of fuel.

3. The hybrid vehicle according to claim 1, wherein the control device decreases the absolute value of the torque lower limit value of the motor during deceleration with a decrease in vehicle speed.

4. The hybrid vehicle according to claim 1, wherein the control device prohibits the torque lower limit value from being changed during output of a deceleration torque from the motor.

5. The hybrid vehicle according to claim 1, wherein when the absolute value of the torque lower limit value is less than a predetermined value, the control device gives a notification of a small absolute value of the torque lower limit value.

6. The hybrid vehicle according to claim 2, wherein the control device decreases the absolute value of the torque lower limit value of the motor during deceleration with a decrease in vehicle speed.

7. The hybrid vehicle according to claim 2, wherein the control device prohibits the torque lower limit value from being changed during output of a deceleration torque from the motor.

8. The hybrid vehicle according to claim 2, wherein when the absolute value of the torque lower limit value is less than a predetermined value, the control device gives a notification of a small absolute value of the torque lower limit value.

9. The hybrid vehicle according to claim 3, wherein the control device prohibits the torque lower limit value from being changed during output of a deceleration torque from the motor.

10. The hybrid vehicle according to claim 3, wherein when the absolute value of the torque lower limit value is less than a predetermined value, the control device gives a notification of a small absolute value of the torque lower limit value.

11. The hybrid vehicle according to claim 4, wherein when the absolute value of the torque lower limit value is less than a predetermined value, the control device gives a notification of a small absolute value of the torque lower limit value.

* * * * *